United States Patent [19]

Davis et al.

[11] Patent Number: 5,129,095
[45] Date of Patent: Jul. 7, 1992

[54] GLOBAL COMMUNICATION SYSTEM RECEIVER AND METHOD FOR OPERATING THE SAME

[75] Inventors: Walter L. Davis, Coral Springs; Philip P. Macnak, West Palm Beach, both of Fla.

[73] Assignee: Motorola, Inc., Schaumburg, Ill.

[21] Appl. No.: 767,352

[22] Filed: Sep. 30, 1991

Related U.S. Application Data

[63] Continuation of Ser. No. 431,117, Nov. 3, 1989, abandoned.

[51] Int. Cl.⁵ ........................ H04B 7/185; H04Q 7/02
[52] U.S. Cl. .................................. 455/12.1; 455/32.1; 455/33.1; 379/59; 340/825.44
[58] Field of Search ........................ 455/12, 13, 32, 33, 455/34, 54, 56; 379/57, 58, 59, 60, 63; 340/825.44, 311.1; 342/356, 357

[56] References Cited

U.S. PATENT DOCUMENTS

| | | | |
|---|---|---|---|
| 3,497,807 | 2/1970 | Newton | 455/13 |
| 4,178,476 | 12/1979 | Frost | 379/57 |
| 4,628,506 | 12/1986 | Sperlich | 370/118 |
| 4,644,347 | 2/1987 | Lucas et al. | 340/825.44 |
| 4,914,649 | 4/1990 | Schwendeman et al. | 455/32 |
| 4,972,456 | 11/1990 | Kaczmarek et al. | 379/59 |

Primary Examiner—Reinhard J. Eisenzopf
Assistant Examiner—Lisa D. Charouel
Attorney, Agent, or Firm—Philip P. Macnak; Vincent B. Ingrassia; William E. Koch

[57] ABSTRACT

A global communications system is described having terrestrial transmitters for transmitting coded message signals in each of a plurality of geographic areas. The global communication system further includes at least one satellite transmitter for transmitting the coded messages signals in each of a plurality of global geographic areas. The coded message signals transmissions include channel identification codewords identifying the terrestrial channels and the satellite channel. The terrestrial channel is selected for operation when the channel identification codeword received matches a first predetermined channel identification codeword. The satellite channel is selected for operation when the channel identification codeword does not match the first predetermined channel identification codeword. When the satellite channel is selected the terrestrial channel is periodically reselected to enable decoding the channel identification codeword received on the terrestrial channel. The terrestrial channel is again selected when the channel identification codeword received on the terrestrial channel matches the first predetermined channel identification codeword.

14 Claims, 16 Drawing Sheets

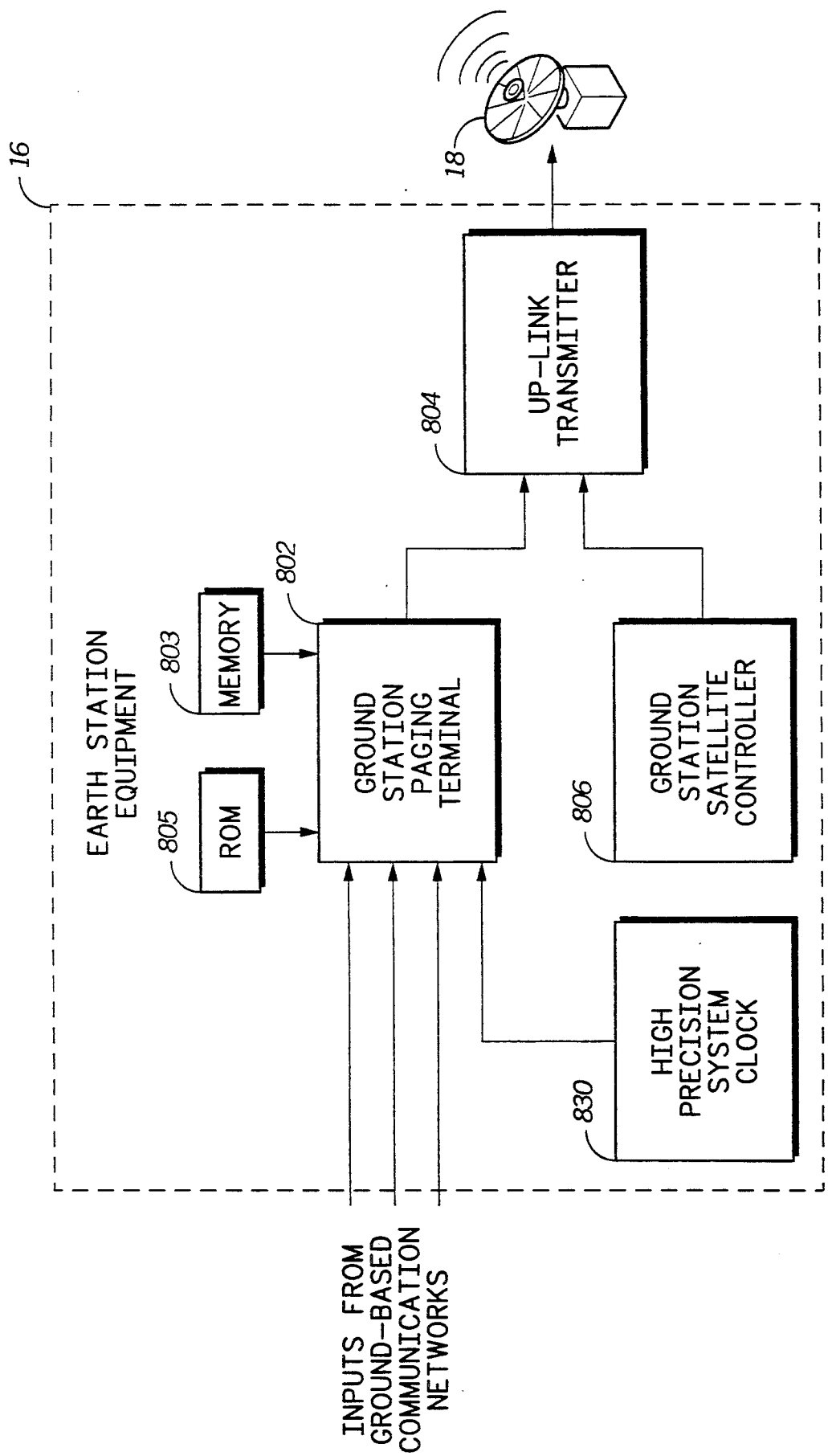

| PREAMBLE | SYNC | SPC | ADR | AC | PAGER ALERT TONE | VOICE | AC |

GOLAY INDIVIDUAL VOICE PAGE

*FIG.12A*

| PREAMBLE | SYNC | SPC | ADR 1 | ADR 2 | • • • • | ADR 15 |

GOLAY TONE ONLY BATCH TRANSMISSION

*FIG.12B*

| PREAMBLE | SYNC | SPC | ADR 1 | DB1 | • • • • | ADR 7 | DB7 |

GOLAY TONE AND DATA BATCH TRANSMISSION

*FIG.12C*

| PREAMBLE | SYNC | SPC | FRAME 1 | • • • • | FRAME 8 |

POCSAG TONE AND DATA TRANSMISSION

*FIG.12D*

GLOBAL COMMUNICATION SYSTEM RECEIVER AND METHOD FOR OPERATING THE SAME

This is a continuation of application Ser. No. 07/431,117, filed Nov. 3, 1989 now abandoned.

BACKGROUND OF THE INVENTION

1. Field of the Invention:

The present invention relates to communication systems and more particularly to a communication receiver capable of operation in a global satellite communication system.

2. Description of the Prior Art

Several communication systems have been described for providing nationwide communication coverage. One such system is a nationwide paging system described in U.S. Pat. No. 4,644,347 to Lucas, et al., entitled "Multiple Frequency Message System" which is assigned to the assignee of the present invention. In the nationwide paging system of Lucas, each geographical area covered by the system includes one or more local service providers operating on one or more paging channels, and a nationwide service provider operating on a nationwide paging channel. Synthesized paging receivers are provided in the system which are capable of operating on a home, or local channel, when the paging receiver is operating in the home geographic area to which the receiver is assigned. In other geographic areas outside the home geographic area which are covered by a nationwide service provider, the paging receiver operates on the nationwide paging channel. The frequency of operation of the receiver is automatically controlled by means of a special transmitted coded signal which is uniquely assigned to both the local paging channels and the nationwide paging channel in each geographic area. In normal operation, when the paging receiver detects the assigned special coded signals on either the local or the nationwide paging channel, the paging receiver reverts to the local paging channel for reception of the transmitted pages. When the paging receiver is outside of the local geographic area, failure to receive the assigned special coded signals, results in the paging receiver to begin searching for a nationwide channel, eventually reverting to the nationwide paging channel, when one of the assigned nationwide paging channels is detected. While such a system as described provides complete "hands off" operation of the paging receiver with regards to channel selection in those geographic areas where a service provider is operating, there may be significant time intervals while the paging receiver is in transit from one location to another, wherein messages directed to the paging receiver must be stored for transmission at a latter time, or where the message are lost due to transmission of the messages when the paging receiver is not within a geographic area where a service provider is operating.

Several proposed nationwide paging systems have addressed the issues of transmission of the messages from one geographic area to another when the user is in transit. One such system is described in U.S. Pat. No. 4,178,476 to Frost. Frost stores the messages while the user is in transit between those geographic areas providing nationwide paging coverage, as do other of the nationwide paging systems.

As described, the currently available nationwide paging systems provide only limited nationwide paging coverage. The coverage is limited because the present nationwide systems provide operation only in those metropolitan areas where a paging system infrastructure is in place. This results in the requirement for the storing and later transmission of pages as described, as the metropolitan areas seldom adjoin sufficiently to provide continuous paging coverage. A nationwide paging system is needed which can not only provide nationwide paging services to those service areas having a paging system infrastructure, but also to those geographic areas which do not presently have a paging system infrastructure.

SUMMARY OF THE INVENTION

It is an object of the present invention to provide a communication system providing global communication coverage.

It is a further object of the present invention to provide a global communication system providing terrestrial and satellite based transmitters.

It is a further object of the present invention to provide a global communication receiver which automatically switches between the terrestrial and satellite based transmitters.

A global communication system comprises terrestrial transmitters for transmitting coded message signals on at least one terrestrial channel in a plurality of geographic areas. The coded message signals include channel identification codewords identifying each of the plurality of geographic areas. The system also comprises a satellite transmitter for transmitting the coded message signals on at least one satellite channel. The coded message signals also include a channel identification codeword identifying the satellite transmission. A receiver is provided capable of receiving the coded message signals on each of the terrestrial and satellite channels. The receiver includes channel selecting means responsive to the received channel identification information for maintaining the receiver operation on the home terrestrial channel when the home channel identification codeword is detected. When the home channel identification codeword is not detected, the channel selecting means selects the satellite channel. When the home country code and/or location code are detected on the satellite channel, the channel selecting means periodically reselects the home terrestrial channel for operation. When the home country code and/or location code are not detected in the satellite channel, receiver operation is maintained on the satellite channel until the home country code and/or location code are detected.

A global communication system comprises terrestrial transmitters for transmitting coded message signals on at least one terrestrial channel in a plurality of geographic areas. The coded message signals include one or more transmission attributes identifying the terrestrial channel in each of the plurality of geographic areas. The system also comprises a satellite transmitter for transmitting the coded message signals on at least one satellite channel. The coded message signals also include a channel identification codeword identifying the satellite transmission. A receiver is provided capable of receiving the coded message signals on each of the terrestrial and satellite channels. The receiver includes channel selecting means responsive to the one or more transmission attributes for maintaining the receiver operation on the home terrestrial channel when the one or more home channel transmission attributes are detected. When the one or more home channel transmission attributes are not detected, the channel selecting means selects the satellite channel. When the home country code and/or location code are detected on the satellite channel, the channel selecting means periodically reselects the home terrestrial channel for operation. When the home country code and/or location code are not detected in the satellite channel, receiver operation is maintained on the satellite channel until the home country code and/or location code are detected.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

FIG. 8B is an electrical block diagram illustrating the apparatus of the trunk station for the global communication system of the present invention.

FIGS. 12A-12D are timing diagrams illustrating representative signaling formats utilized in the global communication system of the present invention.

DESCRIPTION OF THE PREFERRED EMBODIMENTS

Figure 1A:
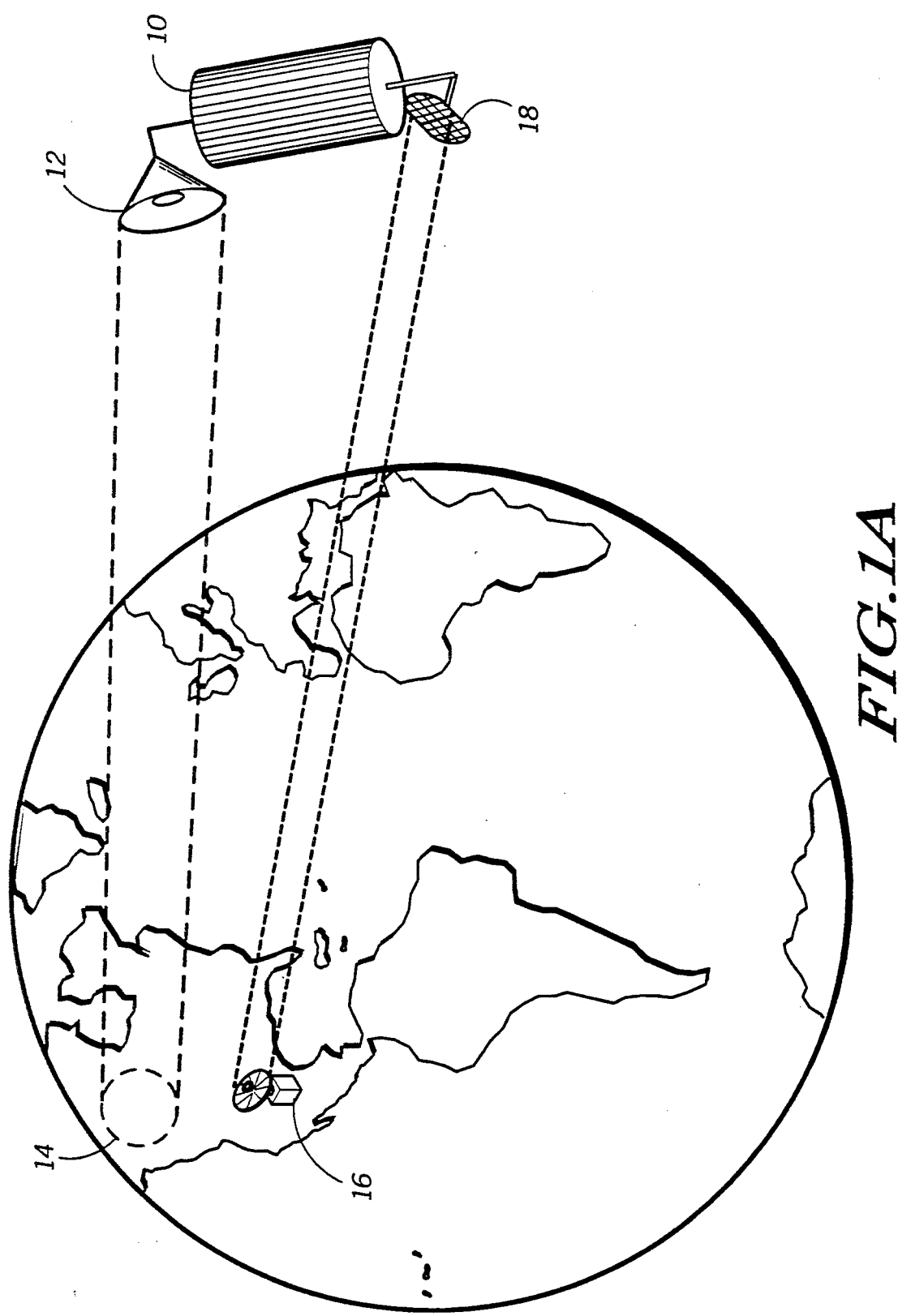
FIGS. 1A and 1B are pictorial representations of a synchronous satellite configuration for a global communication system.
Figure 1B:

With respect to the figures, FIGS. 1 through 13 illustrate the preferred embodiment of a global communication system utilizing global communication receivers. Reference is directed to FIGS. 1A and 1B which show a first embodiment for a configuration of the global communication system of the present invention. As shown in FIG. 1A, one or more satellites 10 (only one of which is shown) are positioned in synchronous orbits for transmitting communication signals to the earth using an antenna 12 with a steerable beam. The steerable beam antenna is used to focus a transmitted radio frequency signal on a small geographical area, such as indicated by the beam footprint of area 14 of FIG. 1A. Such focusing of the transmitted signal produces sufficient ground level signal strength to provide adequate performance of ground based communication receiving equipment, such as paging receivers or pagers, operating within the boundaries of area 14. Wide area coverage is obtained in the system by moving, or steering, the beam to point at different geographical areas 14 on the earth as shown in FIG. 1B. In the system of FIG. 1A, the satellite can also change the signaling protocol and/or the down link frequency when serving customers in different geographical areas. As for example, the down link signal would be transmitted at a frequency of 1.5 Gigahertz (GHz) using the POCSAG signaling format for pagers located in the geographical areas indicated by the letter B for the geographic areas within Europe in FIG. 1B. The down-link signal would be transmitted at a frequency of 900 Megahertz (MHz) using the Golay Sequential Code (GSC) signaling format for pagers located in the geographical areas indicated by the letter A for North and Central America. It will be appreciated, the choice of down link frequency is not arbitrary, but is controlled by the various national regulatory agencies in each country or geographic area covered by the beam footprint, as such, actual transmitter frequencies may vary widely as operating frequencies are assigned within the satellite based communication system.

Entry of the messages into the global communication system is through the public switched telephone network (PSTN) which directs the messages to a ground station 16, or gateway, for transmission of information to the synchronous satellite 10 by way of uplink antenna 18, as shown in FIG. 1A. In the preferred embodiment of the present invention, three synchronous communication satellites at an altitude of approximately 35,000KM would provide total global coverage with ground stations, such as gateway 16, suitably located around the world to communicate with a corresponding synchronous satellite.

When multiple synchronous satellites are employed in the global communication system of the present invention, message information received at any of the ground stations is transferred to the corresponding satellites. However, it will be appreciated, some of the message information transferred to the particular satellite may be directed to pagers which are located in geographical areas not covered by the particular satellite receiving the message information. In this instance, intersatellite communications is provided between each of the synchronous satellites in orbit which allow the transfer of message information to the appropriate satellite which will ultimately deliver the messages to the pagers in a particular geographical area. Intersatellite communications will be described in further detail later in the specification.

Figure 2:
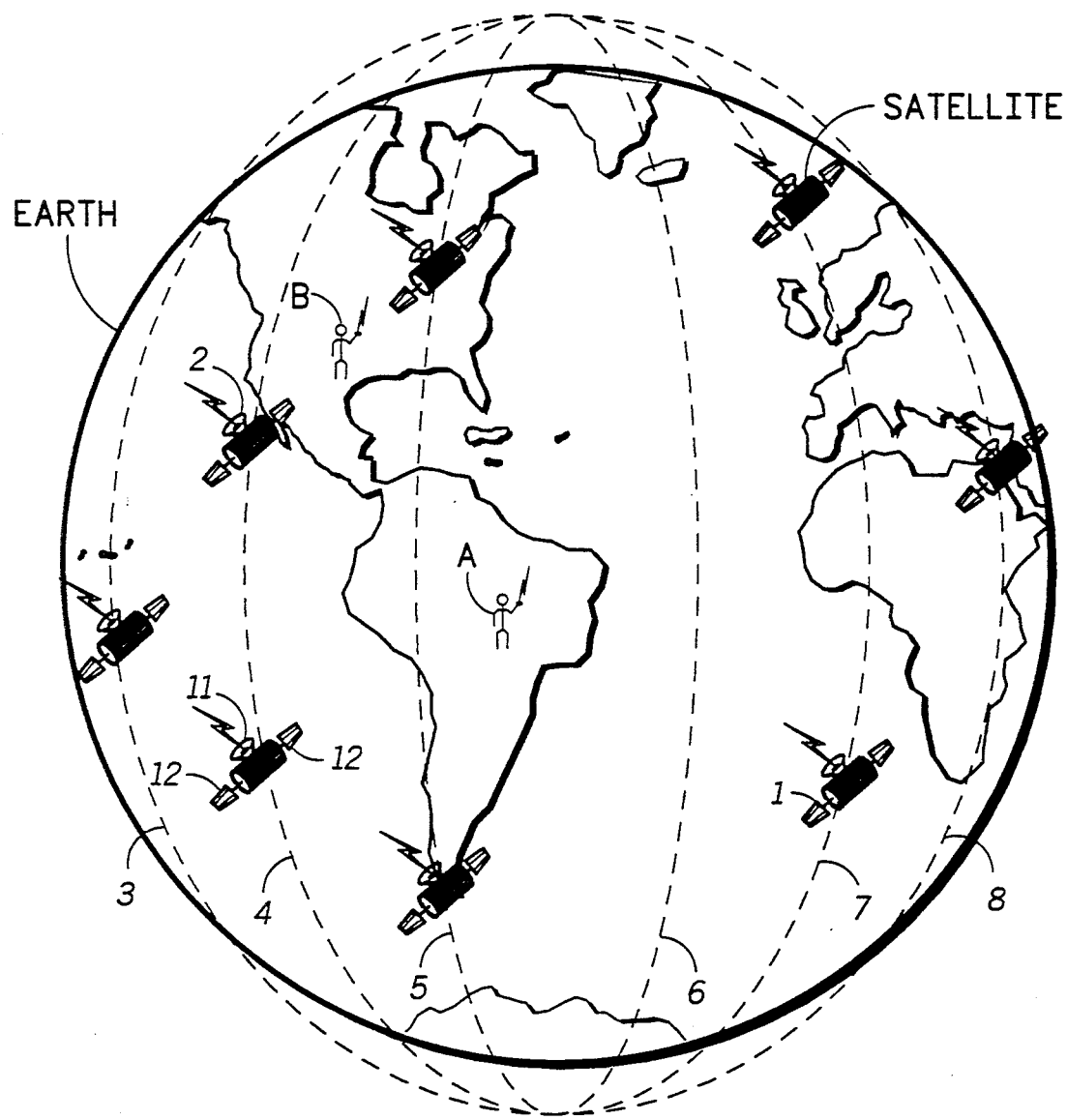
FIG. 2 is a pictorial representation of a non-synchronous satellite configuration for a global communication system.

Referring to FIG. 2, a second embodiment of a satellite configuration for a global communication system is shown. In this configuration, a plurality of satellites are shown in non-synchronous, low earth orbits. The satellites are placed in a number of orbiting planes. The orbiting planes (3 through 8), as shown, are highly inclined in nature and provide paging coverage for the entire earth. With this system, as with the synchronous satellite based communication system of FIG. IA and B, users located anywhere on a land mass, on the water or in the air at an altitude less than that of the orbiting satellites may be paged by anyone having access to the public switched telephone network.

In the preferred embodiment of the non-synchronous satellite based communication system of the present invention, eleven satellites are placed in each of seven orbiting planes at an altitude of 413.53 nautical miles (765.86 kilometers) to provide complete global coverage, with each satellite in this orbit completely circling the globe approximately once every 100 minutes. It will be appreciated by one of ordinary skill in the art that the number of satellites required in the system of FIG. 2, the altitude and the orbit time are a function of how highly inclined are the orbiting planes. Lower inclined orbiting plane configurations would require more satellites than more highly inclined orbiting plane configurations. It will also be appreciated the number of satellites described in the preferred embodiment of the global communication system is by way of example only, and other satellite configurations including a greater number, or a fewer number could be utilized depending upon the particular system requirements.

Figure 3:
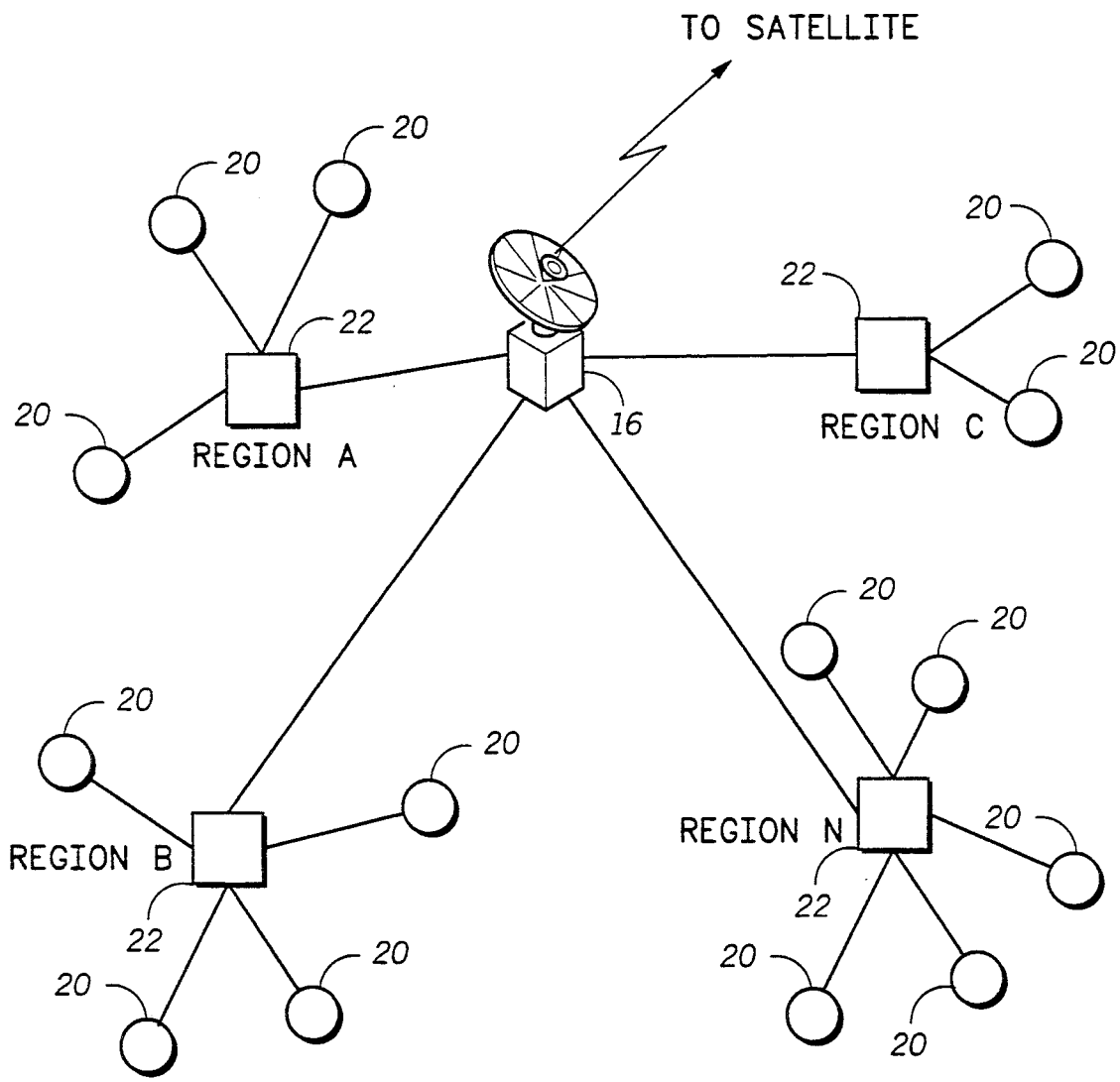
FIG. 3 is a diagram depicting a global telecommunication network used to receive and process messages for the global communication system of the present invention.

Each satellite in either the synchronous or non-synchronous global communication system contains a satellite control systems unit, suitable antennas 11 (helical antennas for up/down links and for cross links, for example) and an unfolding array of solar cells 12 along with storage batteries (not shown) connected to the solar cells to provide power to the control systems unit, and a satellite paging controller to provide any necessary geographic signaling protocol conversion when required. The satellite vehicles themselves are low-earth orbiting satellites such as those commercially available for the non-synchronous satellite based communication system. The satellites in the non-synchronous as well as the synchronous systems, are put into orbit by a launching vehicle. When in orbit, the solar cell array is opened and the switching unit thereby activated. The satellites are then individually brought on line via standard telemetry, tracking and control (TT&C) channels to form the satellite based communication system. In operation, messages are entered into the global communication system from anywhere in the world through the public switched telephone network (PSTN). FIG. 3 depicts a typical interconnection of a portion of the global satellite network which may be used for entry of messages into the global communication system of the present invention. The global satellite network comprises local input nodes 20 and regional input and/or collection nodes 22 which act to concentrate and channel the messages into the satellite based communication system. The local input nodes 20 comprise terminals (not shown), such as paging terminals, which are well known in the art, to receive and process the messages received through the public switched telephone network. The local input nodes 20 are generally located at the facilities of the local paging service providers participating in the global satellite network, and as such, provide both the capability for controlling local paging services, and message handling and processing for the satellite based communication system as well. A large metropolitan area, such as indicated as Region B, can have multiple local input nodes 20, representative of a number of local paging service providers which are participating in the global satellite network. Other geographic areas, such as indicated by Region A could represent local paging service providers located in major metropolitan areas located throughout a country, such as Canada.

The messages directed to the global satellite network are routed from the local input node 20 to the regional input, or collection node 22. Regional collection node 22 acts to further concentrate the messages from each of the local input nodes 20 for a particular geographic area, such as the large metropolitan area, a state, a country, or even a continent. The regional concentration of messages provides the most cost effective means for transmission of the messages to the trunk site 16. Because of the large volume of message traffic which must be handled to fulfill the economic requirements of a satellite based system, it is important that the transmission time required to transmit the messages received throughout the global satellite network be minimized. Message throughput is improved in the system of the present invention by not encoding the messages received at the local inputs nodes into the final signaling format prior to transmission to the trunk site. The messages are transmitted from the local input node 20 to the regional collection node 22, or from the local input node 20 to the trunk site 16 as raw data, such as BCD (binary coded decimal) or ASCII data. It will be appreciated by one skilled in the art, substantial transmission time is saved by only transmitting the raw data using conventional data transmission techniques which are well known in the art, as compared to transmitting the data encoded into the final encoded signaling format, which multiplies the data handling requirements by as much as a factor of two or more.

Interconnection of the network between the local input nodes 20 and the regional input nodes 22, and the regional input nodes 22 to the trunk site 24 may be provided by any of a number of well known methods, such as landlines, and microwave or satellite communications, depending on the distances involved and the volume of message traffic being handled from any given input node. It will be appreciated that the structure of the global satellite network described is by way of example only, and is representative only of a system for concentrating and processing the volume of information which is anticipated in a satellite based communication system.

Figure 4:
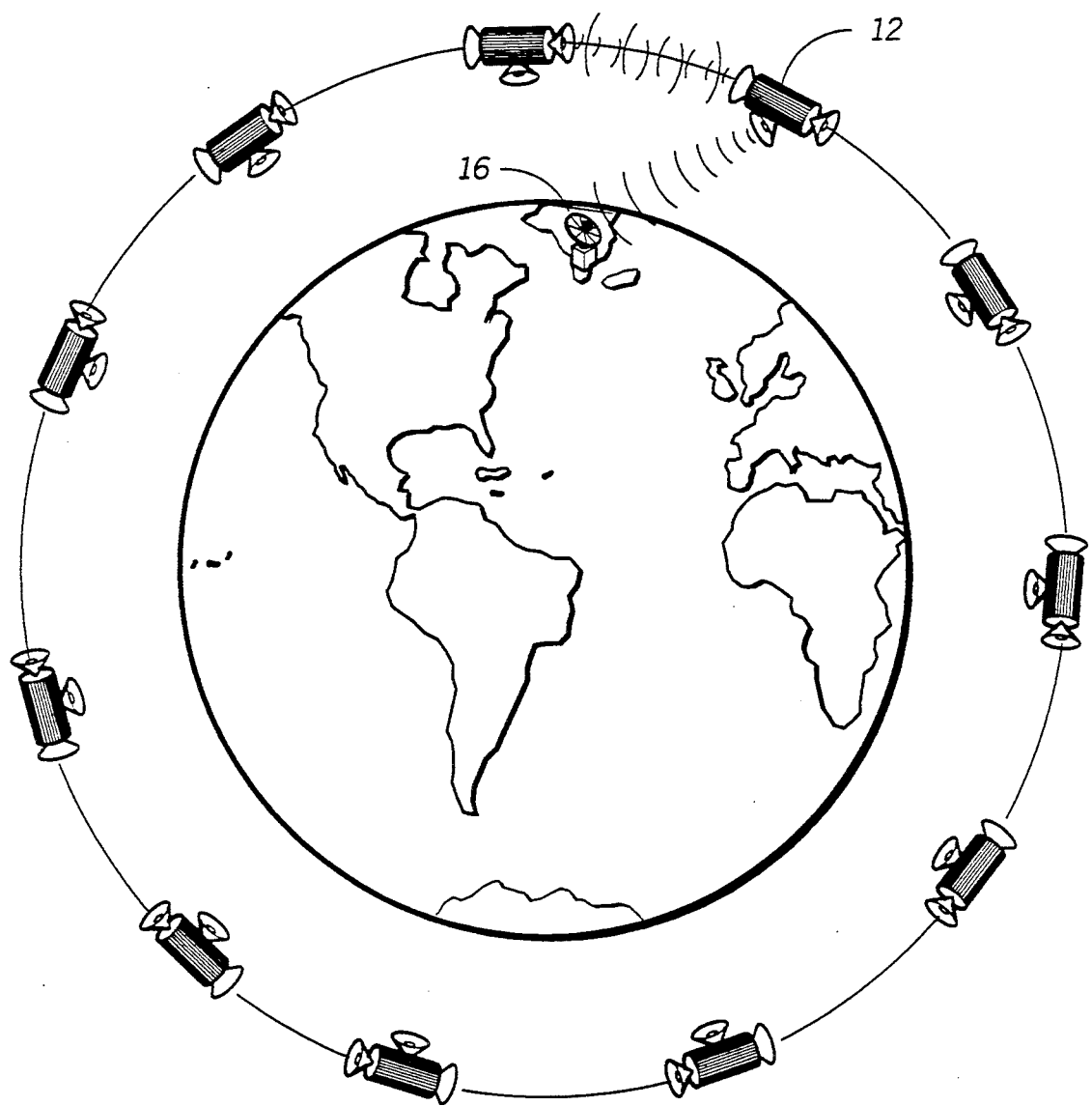
FIG. 4 is a diagram illustrating the ground station to satellite communication for the non-synchronous global communication system of the present invention.

FIG. 4 shows a diagram of the relative positioning for a number of non-synchronous satellites orbiting in any one of the plurality of orbiting planes, as described for FIG 2. An up-link transmitter, or gateway, 16 is provided to transmit the message data received from throughout the system to each of the orbiting satellites 12 as they pass substantially over the gateway 24. Since all satellites in the global communication system are in orbits which pass over the poles, as previously described in FIG. 2, only a single gateway 16 is required to access each of the satellites for control and for message delivery from the gateway 16, as shown. It will be appreciated, the position of the gateway shown is by way of example only, and other geographic locations in the northern or southern polar regions which provide relative easy communication access via phoneline, or RF or satellite communication link would also be suitable for locating the gateway 16.

Figure 5:
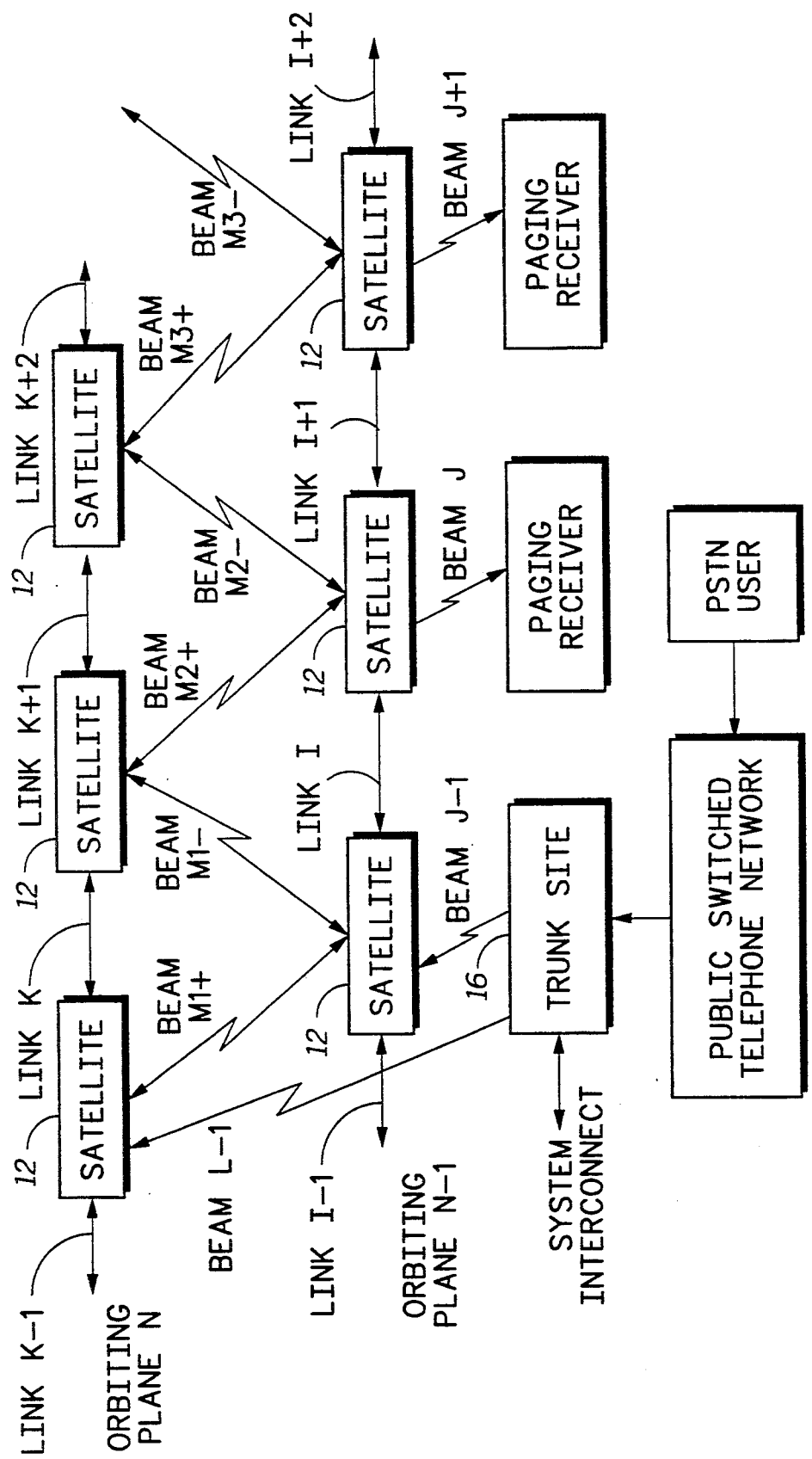
FIG. 5 is a diagram illustrating the intersatellite communication for the non-synchronous global communication system of the present invention.

As shown in FIG. 5, messages received via the public switched telephone network from a PSTN user are routed to the trunk site 16, in a manner similar to that described for FIG. 3. The message information is independently beamed up to each satellite 12 in an orbiting plane as each satellite 12 appears substantially overhead via beams J-1, L-1, etc. Each satellite 12 in a particular orbiting plane is also linked via intersatellite communication to the next satellite and previous satellite, as indicated by example by link I−1, link I, link I+1, and so on, for satellites orbiting in plane N-1. This intersatellite communication system provides a means for distributing messages received by any particular satellite 12 in one orbiting plane to each and any of the other satellites 12 located in the same orbiting plane, or any other orbiting plane. In the latter case, intersatellite communication is provided in the system between one or more satellites 12 in other orbiting planes, as indicated by beam M1+ and M1−, and so forth for satellites 12 orbiting in planes N and N-1. That is, each satellite 12 in a given orbiting plane is linked to a previous satellite (beam M#−) and the next satellite (beam M#+) in an adjacent orbiting plane, thereby providing a means for distributing the received global message information throughout the entire satellite system. The intersatellite links are implemented via data transmission on a communications channel, such as a microwave beam or via a laser beam. Existing technologies currently provide for such data transmission. It will be appreciated, that while the previous description described intersatellite communication for a satellite system utilizing non-synchronous satellites, a similar system is can be used with synchronous satellites.

As previously described in FIG. 2, each satellite in the non-synchronous satellite system of the present invention completely circles the globe every 100 minutes. Since each orbiting plane is occupied by eleven satellites in the preferred embodiment of the present invention, a new satellite appears substantially over any geographic area approximately once every nine minutes from any one orbiting plane. Since there are seven satellite orbits provided in the non-synchronous satellite system of the present invention, a new satellite from one of the seven satellite orbits appears substantially over the gateway 16, once every one minute and eighteen seconds. As a result, global message information and control information is transmitted from the gateway 16 to one of the eleven satellites in one of the seven orbiting planes which regularly appears over the gateway 16. Thereafter, the global message information is processed on-board the receiving satellite, as will be explained in further detail later, for further distribution of the information to the other satellites located around the world, or is transmitted by the receiving satellite to those communication receivers falling in the present track of the receiving satellite.

Figure 6A:
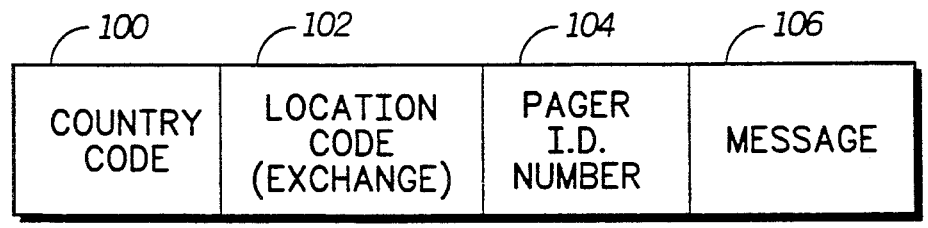
FIGS. 6A and 6B are timing diagrams illustrating formats for entering messages into the global communication system of the present invention.

FIG. 6A, shows one possible format for the entry of information by a message originator through the public switched telephone network. It will be noted, FIG. 6A shows a format that is very similar to that used for international telephone service. That is, the format contains a country code 100, an exchange or location code 102, and a pager I.D. number 104 followed by the message 106. This format would be used when the message originator knows the particular country code 100 and location code 102 information for the pager to which the message is intended. The country code 100 and the location code 102 information is processed at the trunk station to determine satellite routing information which will be described in detail shortly. The routing information defines which satellite in the synchronous or non-synchronous satellite systems will be in position to deliver the message at the earliest time. The country code 100, location code 102, pager I.D. number 104, message portion 106 and the orbiting information are transmitted from the trunk station to the satellite currently overhead. Once received, the routing information is processed, as will be described shortly, to forward the message to the delivery satellite anywhere around the globe. The message delivery satellite uses the country code 100 and location code 102 information to determine the appropriate down link frequency and signaling protocol for message delivery. In one embodiment of the present invention, the information transmitted from the trunk station to the satellites is not encoded, except for that required to guarantee reception at the satellite overhead. The I.D. Number 104 and the message 106, which were received in an ASCII data format, are encoded by the delivery satellite into the appropriate signaling format for the geographic delivery area, such as the POCSAG or GSC signaling formats. At the appropriate time, when the delivery satellite passes over the geographic area determined by the country code 100 and the location code 102 information, the message is beamed down to deliver the message to the intended pager.

Figure 6B:
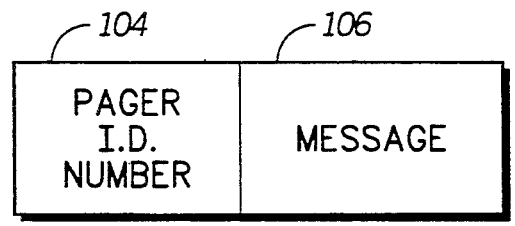

FIG. 6B shows an alternate format for message entry, wherein the country code 100 and location code 102 information is automatically provided by the system based on the current location of the pager to which the message is being directed. In this embodiment, the current location of each pager in the system is tracked in the terminal associated with the local paging system to which the pager is assigned. When the user is in the home, or local system area, messages entered through the local input node, are directed for transmission on the local non-satellite system. However, when the user plans to leave the local area, such as for a business trip from Chicago to Singapore, the user would call in to the paging service provider to indicate the destination, and departure and arrival times. The system thereafter automatically adds the country code 100 and the location code 102, to the pager I.D. number 104 and the message 106 entered by the message originator. The system thereafter automatically routes the message through the satellite system, as previously described, to the proper geographic area, adding the appropriate country code 100 and location code 102, when the user is away from the local system, and omits the country code 100 and the location code 102 when the user is within the area of the local system. In this the second embodiment for message input, the required coding changes are transparent to the call originator, while the message may be delivered anywhere in the world.

Figure 7:
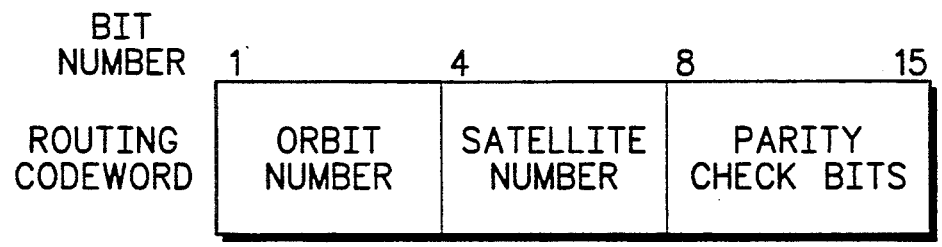
FIG. 7 is a timing diagram illustrating the format for satellite routing in the global communication system of the present invention.

As previously described, satellite routing information is added at the trunk station prior to the up-link transmission to the satellites overhead. The format of the satellite routing codeword are shown in FIG. 7 It will be appreciated the format of the codeword shown is for example only, as other codeword formats may be provided depending upon the number of satellites and orbits provided within the satellite system. As the messages are received at the trunk station, the country code and location code are evaluated to determine which satellite will be in a position to deliver the message at the earliest possible time. The routing code provides an orbit number 108 and satellite number 110 of the satellite that will be scheduled to deliver the message. The delivery satellite selection is based upon a number of factors, such as whether the system is synchronous or non-synchronous, and the time to transmit the messages to the satellites and to route the messages through the satellite system. The messages are transmitted from the trunk station to the receiving satellite currently overhead in data packets containing a predetermined number of messages. After the data packet has been received by the receiving satellite, the routing code for each of the predetermined number of messages is processed to determine the routing through the intersatellite communication system for each message. Depending on the grouping of messages for the various geographic areas, it will be appreciated there can be numerous routes initiated by the receiving satellite.

In an alternate embodiment of the present invention, the routing code, rather than being determined at the trunk station, is determined by the receiving satellite. This embodiment reduces the amount of information which must be transmitted from the trunk station to the satellites, but as it will be appreciated, increases the complexity of the processing required by each satellite.

Figure 8A:
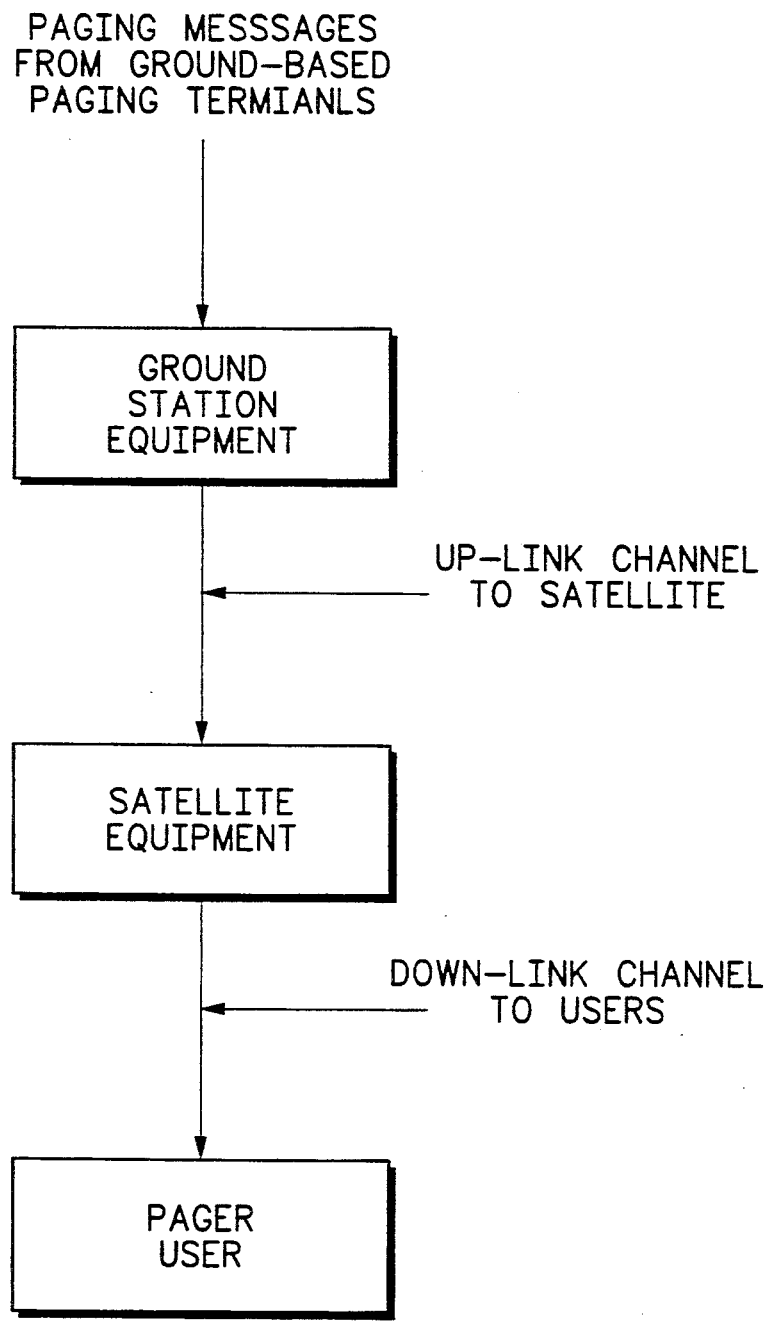
FIG. 8A shows a simplified block diagram depicting the flow of the message information through the global communication system of the present invention.

FIG. 8A shows a simplified block diagram depicting the flow of the message information through the global communication system. The paging messages received at the local input nodes via the public switched telephone network are received by the trunk station. The messages are processed, as previously described, by the ground station equipment described in FIG. 8B. The processed messages are transmitted to the satellites in data packets via an up-link channel as each new satellite appears substantially overhead, as in the case of a non-synchronous satellite system. The received data packets are processed by the satellite equipment described in FIG. 8C. This processing includes such steps as the selection of the transmission frequency, and encoding of the message information into the signaling protocol required for the geographic delivery area. At the appropriate time, the satellite beams down the messages using a down-link channel set to the proper frequency for the geographic area. The messages after they have been beamed down, are received by pagers operable in the satellite system, whereupon the user is alerted for having received the message.

FIG. 8B is a block diagram illustrating the apparatus of the trunk station 16 for the global communication system of the present invention. Messages transmitted through the global satellite network are received at the trunk station 16 by the ground station paging terminal 802 through one or more inputs. As previously described, the message information delivered to the inputs may be delivered via landline, or microwave or satellite communication, or any combination thereof. The ground station paging terminal 802 receives the message information in a manner well known in the art, temporarily storing the information in ground station memory 803 in an active message file, or queue. Ground station memory 803 provides non-volatile storage of the received message information, such as provided by a hard disk memory. As previously described the country code and location code information added by the terminal at the local input node, is processed and the appropriate routing code for each message received is determined and added to the corresponding message data stored in the active message queue. The routing information is determined from satellite network information stored in read only memory (ROM) 805 and the known current position of each of the satellites around the world based on the satellite system timing derived from the high precision system clock 830.

The format of the information of the active message queue is essentially the same as when originally entered into the system, in a BCD or ASCII format together with the added codewords for satellite routing, as previously described. At the appropriate time, as determined from the high precision system clock 830 which couples to the ground station paging terminal 802, the active message queue is recovered from ground station memory 803 by the ground station paging controller 802, and is transmitted by up-link transmitter 804 as a message data packet having a predetermined number of messages using directional antenna 18 and conventional telemetry techniques to the satellite appearing substantially overhead. In addition to the transmission of the active message queue to each satellite as they appear substantially overhead, a ground station controller 806 generates control data for transmission via the up-link transmitter 804 for controlling the operation of the satellite and its on-board systems, such as for corrections to each satellites orbit as it appears substantially over the gateway. It will be appreciated, the message data packet size is determined by the time the satellite remains substantially overhead and is in a position to receive information, the data bit rate of the data transmission, and the time remaining after the satellite control information has been transmitted.

Figure 8C:
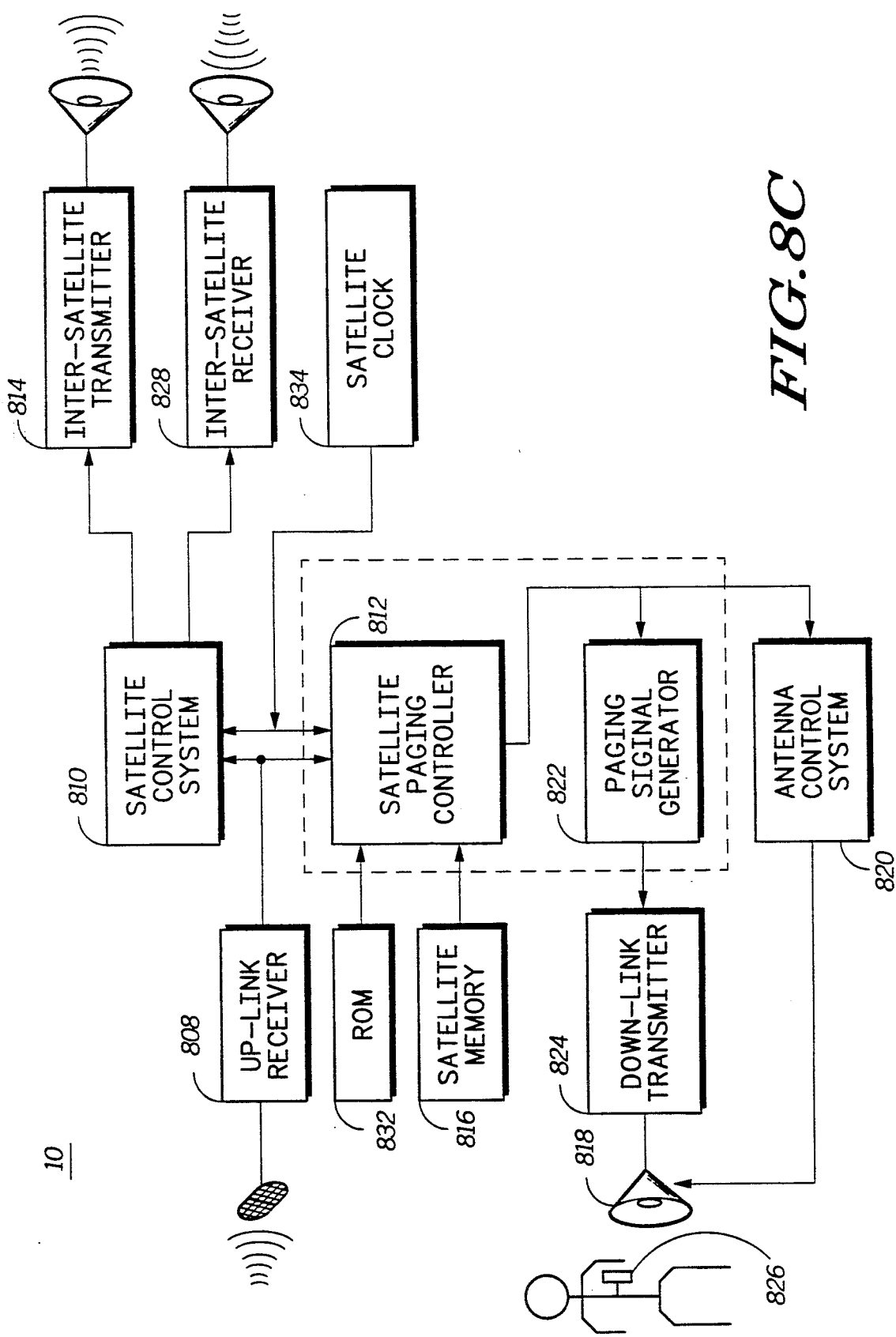
FIG. 8C is an electrical block diagram illustrating the apparatus of the satellites for the global communication system of the present invention.

FIG. 8C is a block diagram illustrating the apparatus for each of the satellites of the present invention. The control information and data packets transmitted from up-link transmitter 804 are received by the satellite 10 by up-link receiver 808. The control information is processed in a manner well known to one skilled in the art by the satellite control system 810, controlling such satellite parameters as satellite orientation and altitude. The message information is processed by the satellite paging controller 812. When the routing code is included in the message data packet, the paging satellite controller 812 determines which of the nearest satellites will be used in routing the message information not intended for transmission by the receiving satellite. The intersatellite message routing is determined from satellite network information stored in the satellite read only memory (ROM) 832. The message information intended for transmission by the other satellites can be transmitted to the appropriate nearest satellite using intersatellite transmitter 814, or may be temporarily stored in satellite memory 816 until all the received message information has been processed, after which the data may be transmitted in batches to the appropriate nearest satellites.

The message information intended to be transmitted by the receiving satellite is further processed by satellite paging controller 812 for country code and location code to determine when the transmission of the message information will occur. The message information is then temporarily stored in memory 816 until the appropriate transmission time is reached. The transmission time is determined from the satellite control system 810 which receives timing information from satellite clock 834 to determined the satellites current position around the world. The satellite control system 810 generates periodic position signals which are coupled to satellite paging controller 812, thereby allowing the satellite paging controller to determine the protocol requirements for each geographical area from protocol information stored in satellite ROM 832. As the satellite travels over each geographic area during which down-link transmissions are to be made, the satellite paging controller 812 controls the down-link antenna 818 direction via antenna control system 820. Any message information which is stored in memory 816 will be recovered at the appropriate time by satellite paging controller 812 from satellite memory 816 and supplied to paging signal generator 822. The paging signal generator 822 provides a programmable encoding means for encoding the message information which was received in the first predetermined signaling format, as previously described, and encodes the message information into a second predetermined signaling format corresponding to the signaling protocol utilized in each geographic area to which the satellite antenna is directed. Satellite paging controller 812 also controls the transmission frequency of down-link transmitter 824 thereby allowing the message information encoded in the signaling protocol for the particular geographic area to be transmitted on the down-link frequency appropriate for the particular geographic area. The transmitted message information can then be received by the paging receiver 826 anywhere within the coverage area of the antenna beam.

When message information is routed from one satellite to the next, the routed message information is received by intersatellite receiver 828. Satellite paging controller processes the received message information to determined if the received information is intended to be transmitted from the receiving satellite, or if the message information is to be routed to the next satellite in the present orbit, or in an adjacent orbit. Message information intended to be transmitted by the receiving satellite is stored as previously described and transmitted at the appropriate time as previously described. Message information not intended to be transmitted by the receiving satellite is routed to the next satellite also as previously described. While only a single intersatellite transmitter and receiver are shown in FIG. 8C, it will be appreciated multiple transmitters and receivers will be required to provide intersatellite communication between satellites is a given orbit and with satellites in different orbits.

Figure 9:
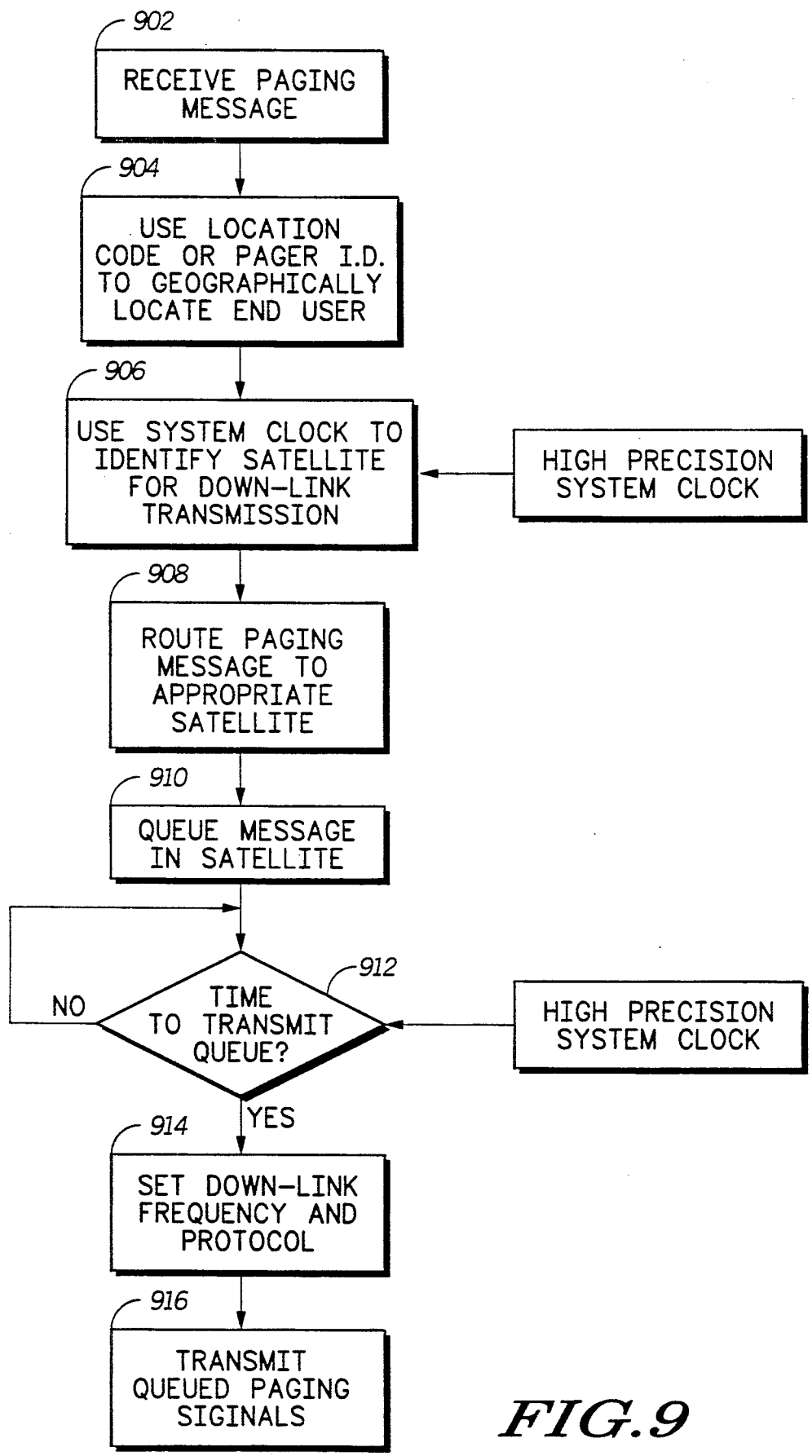
FIG. 9 is a flow chart illustrating the message flow for the global communication system of the present invention.

FIG. 9 is a flow chart of the message processing for the global communication system of the present invention. When a message is received at any of the local input nodes, at block 902, the local terminal determines the present status of the pager for which the message is intended, i.e. whether the pager is currently assigned to receive the messages through the local paging system, or through the global communication system. When the message is to be delivered through the global communication system, at block 904, a country codeword and a location codeword are assigned and are added to the message, when such automatic assignment is provided, or the location codeword entered with the message is processed to determine the assigned country codeword and location codeword. The message information is then forwarded to the trunk site for transmission t the satellites.

When the trunk site receives the message information, the country codeword and location codeword are processed to identify the satellite routing information, at block 906. The satellite routing information is determined from the present location of each of the satellites in orbit, and the time required to deliver the message information to the appropriate satellite for down-link transmission using the system clock.

The message information is next transmitted as a data packet to the next satellite appearing substantially overhead the trunk site. The receiving satellite processes the routing information, at block 908, to determine whether the message is to be delivered from the receiving satellite, or any other satellite. When the message is received at the appropriate satellite for down-link transmission, the message is queued, at block 910, for subsequent transmission. When the transmission time is reached, at block 912, which indicates the satellite is over the correct geographical area, the down-link transmitter frequency is set and the programmable encoder is set for the signaling protocol required for the particular geographical area, at block 914. The message information is encoded into the correct signaling protocol, and transmitted via the down-link transmitter, at block 916, to the pager for which the message is intended, which is now located in the current transmission area.

Figure 10:
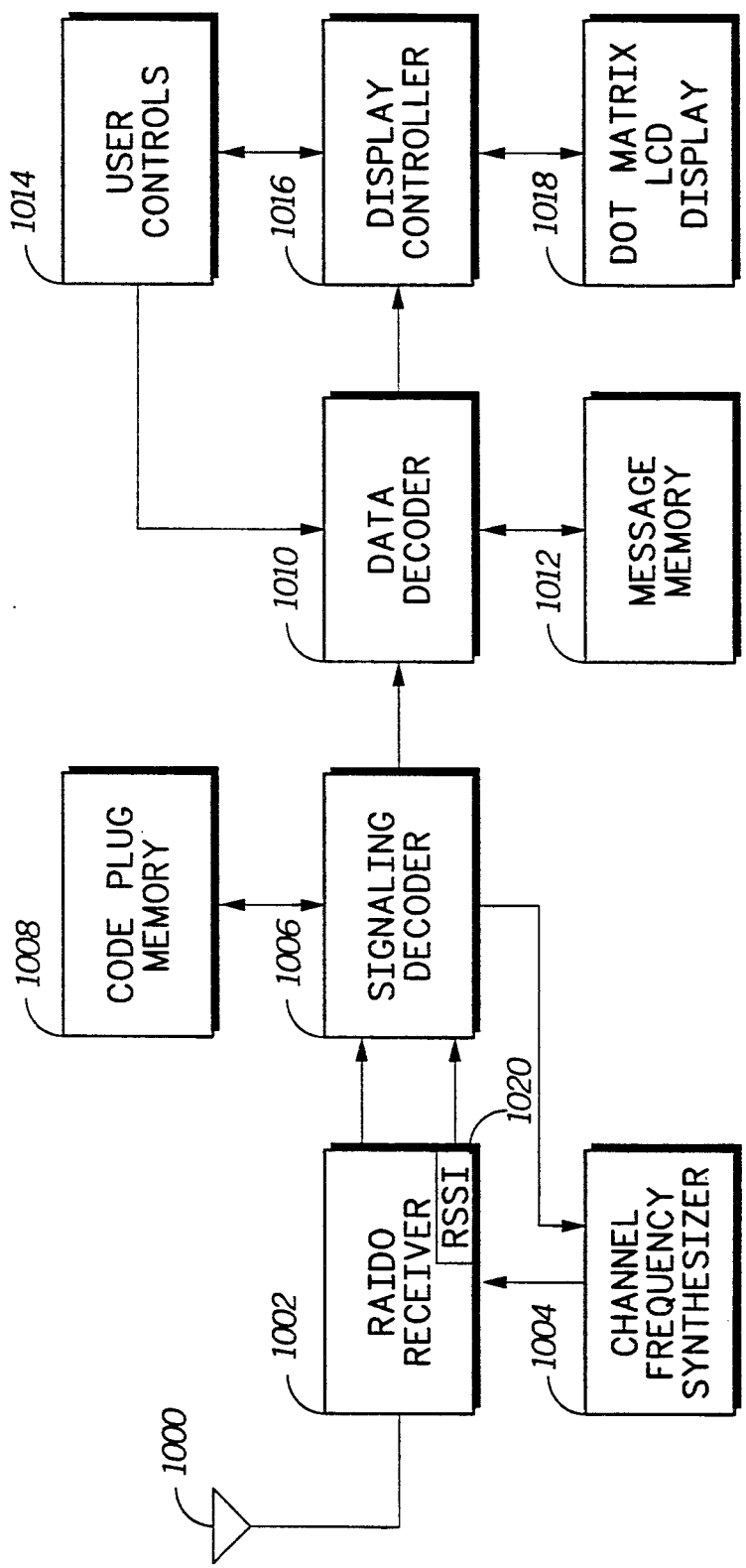
FIG. 10 is an electrical block diagram of a global communication receiver for use in the global communication system of the present invention.

FIG. 10 shows an electrical block diagram of a portable communication receiver, or global communication receiver or pager, for use in the global communication system of the present invention. Data packets containing paging addresses and message directed to pagers located in particular geographic areas are beamed down to the pagers in the second predetermined signaling format, corresponding to the signaling format to which the pager decoder is responsive. The data packets are intercepted by the pager antenna 1000 for reception by receiver 1002. Receiver 1002 is a conventional FM receiver operating, preferably in the 900 MHz to 2.0 GHz frequency range. The choice of operating frequency is regulated by the ITU and national regulatory agencies as previously described, and is controlled by channel frequency synthesizer 1004 in a manner well known in the art. The output of receiver 1002 is a stream of binary data corresponding to the received data packet information. The stream of binary data is applied to the input of signaling decoder 1006, where the data is processed in a manner well known in the art. Since the data packets received may be transmitted in any of a plurality of signaling formats, such as the Golay Sequential Code (GSC) or POCSAG signaling formats, data decoder 1010 is adaptive to decode either signaling format. One such adaptive decoder is described in U.S. Pat. No. 4,518,961 to Davis et al, entitled "Universal Paging Device with Power Conservation" which assigned to the assignee of the present invention and which is incorporated by reference herein. The ability to adaptively decode a plurality of signaling protocols is useful in providing one of a number of transmission attributes which is suitable for identifying the home channel, other than by the transmission of a special code, as will be described in detail shortly. The decoder may also adapt to the proper signaling format based on a received codeword from the satellite, such as the country code or location code codewords previously described.

Also coupled to the radio receiver 1002, is a received signal strength indicator (RSSI) 1020, the operation of which is well known in the art. The RSSI 1020 is useful in providing another of a number of transmission attributes which is suitable for identifying the home channel, other than by the transmission of a special code, as will be described in detail shortly When an address is received in the transmitted data packet which corresponds to an address stored in code plug memory 1008, the signaling decoder 1006 generates a control signal enabling the operation of the data decoder 1010. The received message is processed by the data decoder 1010 which converts the message information received in the predetermined signaling format, to BCD or ASCII data which is then stored in the message memory 1012. Upon completion of the processing of the message information, the user is sensibly alerted by an alerting means (not shown) which couples to the signaling decoder 1006, such as by an audible tone, or a tactile vibration to indicate a message has been received. Upon being alerted, the user can read the stored message by means of user controls 1014. The user controls 1014 also provide the user such additional capability as to reset the audible or tactile alert, place the receiver in a deferred page mode, erase the message, and protect the message in a manner well known in the art. The message read from message memory 1012 is supplied to display controller 1016 which provides the necessary conversion from the BCD or ASCII data to that required for display of the message on display 1018. Display 1018 is preferably an LCD display, such as a dot matrix LCD display capable of displaying alphanumeric message information. The recovery of message information from the message memory 1012 and display of the recalled message information is well known in the art.

Figure 11:
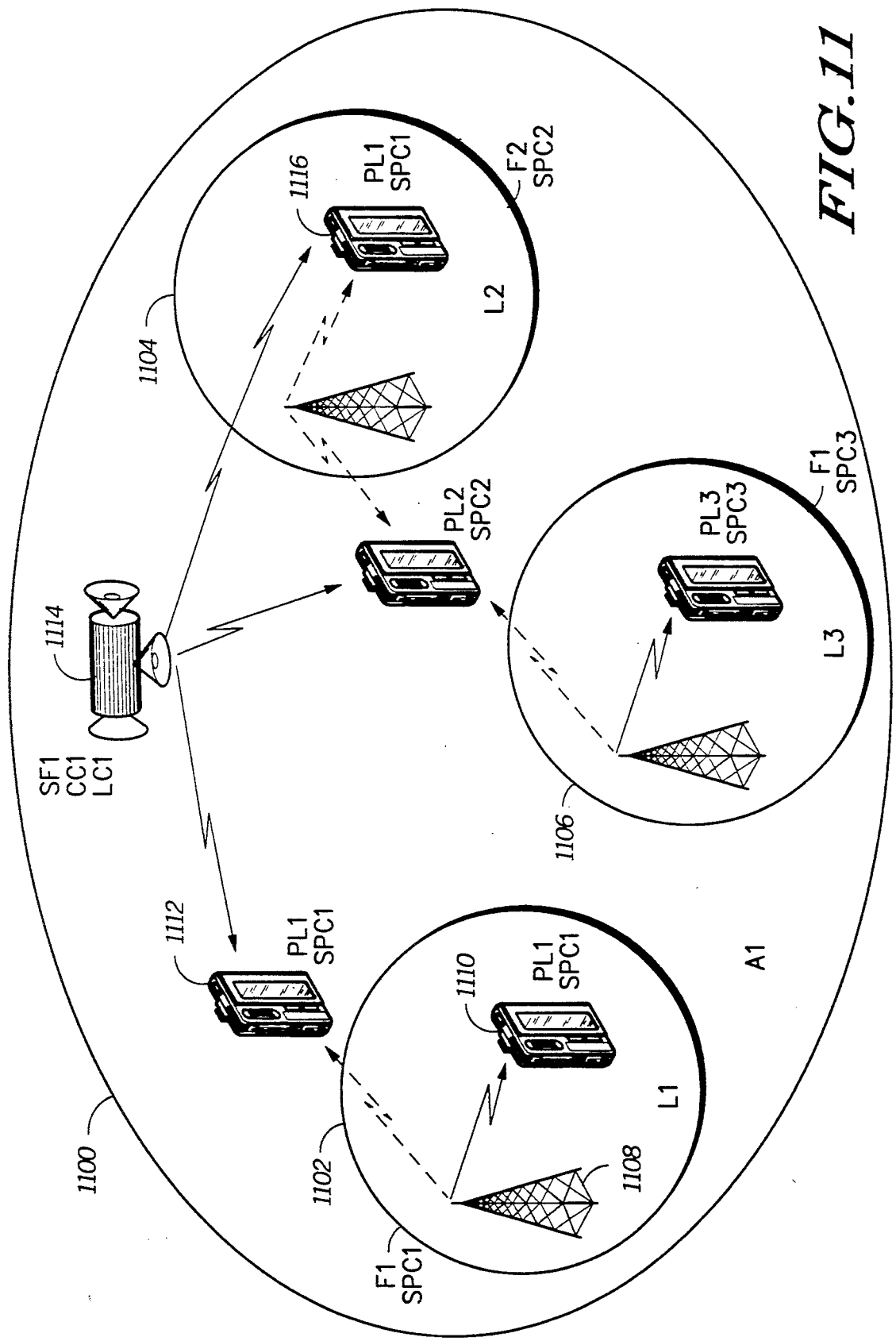
FIG. 11 is a diagram illustrating the operation of a global communication receiver in the global communication system of the present invention.

The operation of a global pager operating in the global communication system described, may be best understood with reference to FIG. 11. In the system of the present invention, the global pager is assigned to operate on a home, or local, terrestrial paging channel when in the home, or local, geographic area. Implementation of such a local terrestrial paging channel is well known in the art. As shown in FIG. 11, the beam from any of the orbiting satellites generates a footprint 1100 substantially greater than the geographic area (1102, 1104, 1106) encompassed by the home system to which the global pager is assigned. Each of the local areas (1102, 1104, 1106) shown may represent a single city or large metropolitan area. As previously described, the global pager is a multifrequency scanning pager capable of operating on the home, or terrestrial channel, or frequency, such as F1 in local area 1102 and 1106, and F2 in local area 1104. The global pager also is capable of selecting the satellite channel, or frequency SF1 when the global pager is outside the home area.

Each local area includes one or more system transmitters 1108, as required to provide adequate system coverage. It will be appreciated, systems in major metropolitan areas would require significantly more transmitters than smaller system covering only a small geographic area, such as systems operating in a small city.

The transmissions from the system transmitters 1108 may be coded, such as including a special code (SPC1, SPC2 or SPC3 shown for purposes of illustration). While the description to follow will describe the operation of the system of the present invention wherein a special code is included in the transmission of the information on the home channel, it will be appreciated other attributes of the transmission may also be used to identify the home system. One such transmission attribute is frequency of operation, wherein the local operating frequency is not repeated within the same geographic coverage area 1100 provided by a particular satellite. Other suitable transmission attributes include the particular signaling protocol in use on the home channel as compared to other channels within the same geographic area. The baud rate of the protocol transmission on the home channel as compared to other channels within the same geographic area may also be used to identify the home channel. The use of coded synchronization codewords as shown in FIG. 12D, to provide an additional identifiable transmission attribute, in place of the requirement for an additional codeword, such as the special code shown in FIGS. 12A–12C is also suitable, or any combination of transmission attributes may be used to uniquely identify the home channel of operation.

For purposes of the following description, each geographic area, or system is uniquely coded, as shown. A global pager, such as global pager 1110, shown operating in local area 1102 is assigned the special code SPC1 identifying those transmissions originating in local area 1102 as being the home channel. As long as global pager 1110 remains in the home area and continues to regularly receive the correct special code SPC1, global pager 1110 would remain tuned to the local area frequency, as in prior art paging systems. However, unlike the pagers of prior art systems, such as some nationwide prior art systems, a global pager, such as global pager 1112 which has moved beyond the area of coverage provided within local area 1102, can continue to receive messages from the satellite 1114 during the time global pager 1112 remains outside the local area 1102, such as when global pager 1112 is in transit From local area 1102 to local area 1104, which may represent, for example, the user traveling from Washington, D.C. to New York. The transfer of messages from the home system to the satellite based system will be described in detail shortly.

When the global pager, such as global pager 1112, leaves the local coverage area, global pager 1112 will no longer detect the special code SPC1, or home transmission attributes, assigned to the home channel in the transmissions originating from transmitter 1108. Should global pager 1112 continue to fail to receive the special code SPC1 for a predetermined number of times, such as three times, or for a predetermined length of time, such as five minutes, global pager 1112 would switch to the home global satellite geographic area frequency, in this instance SF1 corresponding to the local global satellite geographic area 1100. As long as global pager 1112 detects the country code and/or location code corresponding the local geographic area 1102, global pager 1112 would periodically reselect the local channel frequency to determine whether or not global pager 1112 has re-entered the local coverage area, such as area 1102.

Should global pager 1112 fail to detect the correct country code CC1 and/or the location code LC1 for the home satellite geographic area 1100 from the transmissions originating from satellite 1114, such as would occur when global pager 1112 is located in a different global satellite geographic area, the global pager 1112 would begin scanning other satellite frequencies in an attempt to identify the satellite geographic area in which global pager 1112 is actually located. Unlike the prior art nationwide paging system pagers which lost contact with the nationwide system while in transit from area to area, the global pager of the present invention is capable of automatically maintaining continuous contact with the home channel or one of the satellite based channels for message delivery. Once the global pager has locked to the satellite channel for the particular geographic area in which the pager is currently operating, the bit rate of the transmissions are determined such that the transmissions on the satellite channel can be detected in a manner well known in the art to determine the proper decoding format for messages to be delivered in the area from the country code and location code information. Should global pager 1112 enter a different local geographic area, such as global pager 1116 which entered geographic area 1104, the detection of the special code SPC2 which is different from the special code SPC1 assigned to the global pager, would indicate to global pager 1116 that the pager should switch channel frequency to remain in contact with the local satellite channel. The format of the transmissions on the local paging channels and the satellite channels are shown in FIGS. 12A-12D. FIGS. 12A-12C show a coding format for the transmission of voice, tone and data messages using an a synchronous coding format, such a the Golay Sequential Code or GSC coding format. The ground based, terrestrial channels would be capable of transmitting voice, tone and data messages, whereas the satellite based channels would generally be limited to tone and data message transmissions. This limitation is due to the increased signal strength requirements for voice transmission, and it will be appreciated, such limitation will eventually be eliminated, as satellites with greater transmitter power outputs on a given channel become available.

A detailed description of the transmission formats shown in FIGS. 12A-12C are provided in U.S. Pat. No. 4,644,347 issued Feb. 17, 1987 to Lucas et al., entitled "Multiple Frequency Message System" which is assigned to the assignee of the present invention and which is incorporated for reference herein. In the transmission formats of FIGS. 12A-12C, the special code transmitted on each of the local channels is identified as the channel identification codeword SPC, and as previously noted, is different for each of the local channels in each of the plurality of geographic areas the local channels are located. The format of transmissions from the satellite channel are similar in format to that shown in FIGS. 12A-12C, except that instead of the special code identifying the local channels, the channel identification codeword SPC represents the country code, or codeword, and/or the location code, or codeword, previously described in FIG. 6A.

The transmission format for a synchronous coding format, such as the POCSAG signaling format is shown in FIG. 12D. As in the Golay Sequential Code signaling format, a channel identification codeword SPC is provided following the synchronization codeword in the standard POCSAG signaling format, and represents the channel identification codeword when transmitted from the local terrestrial channels, and the country codeword and/or location codeword when transmitted from the satellite based channels.

While FIGS. 12A-12D show the use of a special code to provide channel identification information, especially on the home channel, it will be appreciated other forms of channel identification information, as previously described, such as transmission attributes may be used as well, and may provide a reduction in the amount of information which must be transmitted to identify the home geographic channel.

Figure 13A:
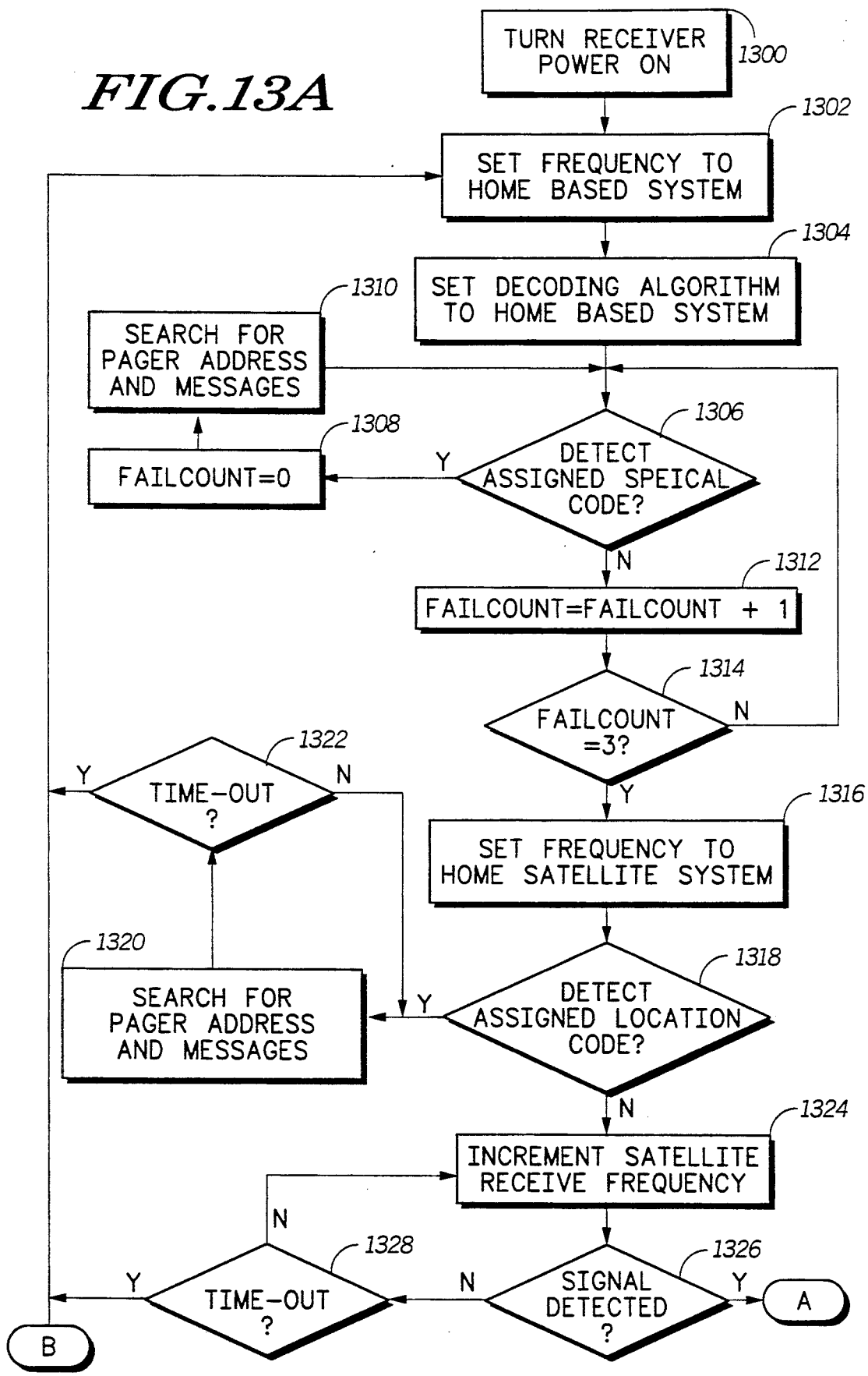
FIGS. 13A and 13B are flow charts illustrating the operation of the global communication receiver of the present invention.
Figure 13B:
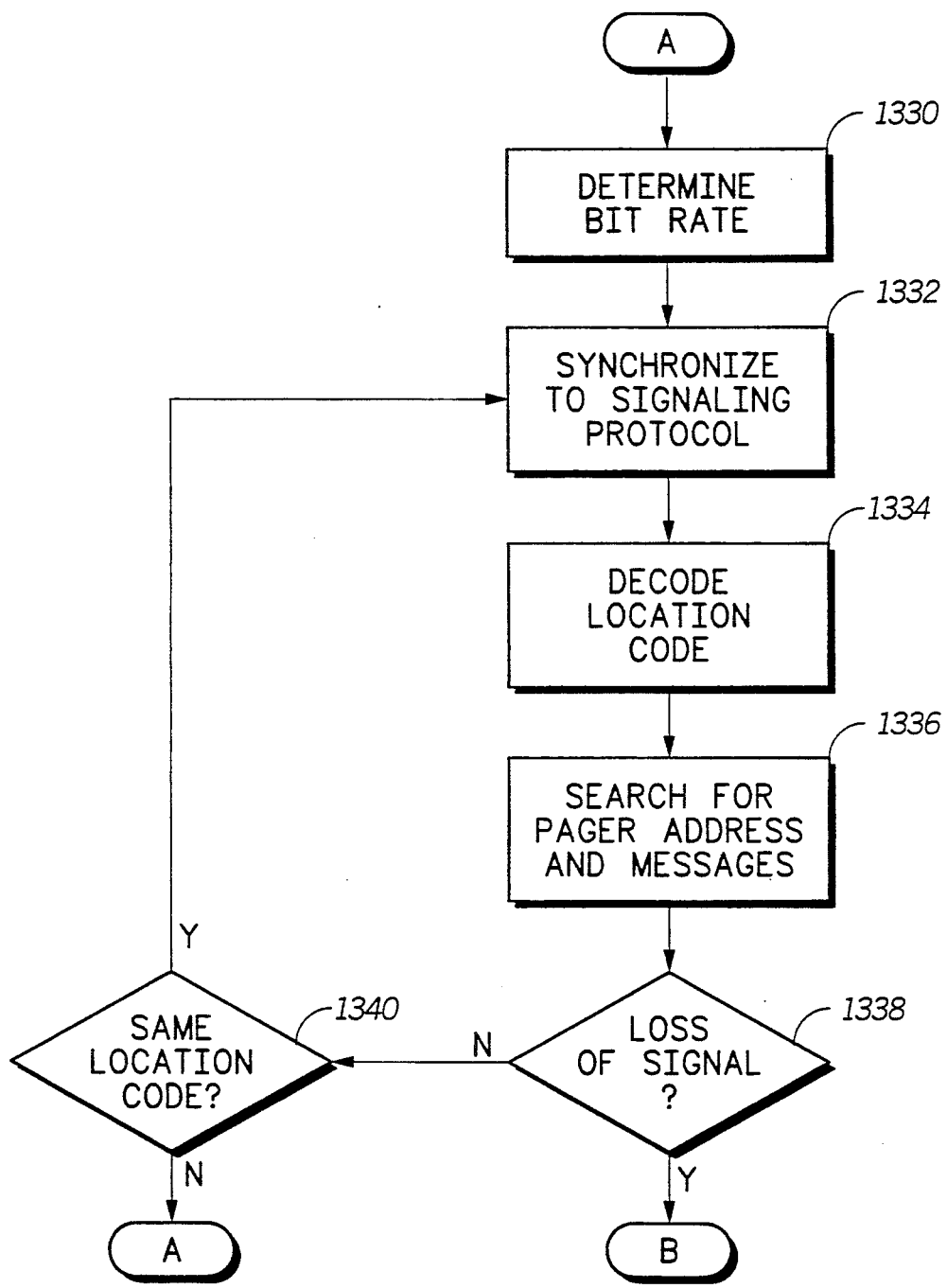

FIGS. 13A and 13B show a flowchart describing the operation of a global pager of the present invention. When power to the receiver is turned on at block 1300, the microcomputer is initialize, including the initialization of the failcount counter, the operation of which will be described in detail shortly. The channel frequency synthesizer is set to the home channel frequency, at block 1302, and the signal decoder is set to decode the home channel decoding, or signaling algorithm, at block 1304. Power is periodically applied to the receiver, as is well known to provide the well known battery saving function. depending upon the signaling format to which the decoder is set to decode, when power is applied to the receiver, the output of the receiver is monitored by the signal decoder to detect the preamble, synchronization codeword, and special code, as in the POCSAG signaling format, or the preamble, start code, and special code, as in the case of the Golay Sequential Code. When the special code assigned to the global communication receiver which is stored in the code plug, or address memory, is detected, at block 1306, the failcount counter is reset to zero, at block 1308, if it is not already set to zero. The decoder begins correlating for addresses, at block 1310, in a manner well known in the art, for the signaling format set for the home channel. When an address is detected, at block 1310, the message following the address (if one is present) is received and stored for presentation to the global pager user.

Should the signal decoder fail to detect the presence of the correct assigned special code, at block 1306, which will happen when the global pager travels outside the coverage area provided by the local system, the failcount counter value is increased by one, at block 1312. The stored count in the failcount counter is checked at block 1314, and if the count does not exceed three, the signal decoder continues to look for the assigned special code at block 1306. When the failcount value of the failcount counter equals three, at block 1314, the signal decoder generates an output to change the channel frequency synthesizer output to the home geographic area satellite frequency, at block 1316. It will be appreciated by one of ordinary skill in the art, the choice of the number of detections of the assigned special code which must be missed before the channel frequency synthesizer is set to the global satellite frequency is a matter of design choice, and is selected to substantially preclude falsely switching to the satellite channel frequency while the global pager is operating in the local geographic area. When the decoder has switched to the home satellite system channel, the decoder begins correlating for the assigned country code and/or location code, at block 1318. When the assigned country code and/or location code are detected on the satellite channel, at block 1318, the signal decoder begins searching for an addresses and messages transmitted from the satellite, at block 1320. When addresses and messages are received on the satellite channel, at block 1320, they are processed in a manner as previously described.

When the assigned country code and/or location code was detected, at block 1318, indicating the global pager was operating in the home global geographic area covered by a satellite, a timer was also started. The timer is started to insure that if the decoder falsely selected the satellite channel due to the global pager briefly leaving the area of coverage of the home channel, or loosing signal due to being blocked within a building, the local channel is periodically reselected, restoring the global pager to the proper home operating frequency. If the time has not timed out, at block 1322, the decoder continues to correlate for addresses at block 1320. When the timer times out, at block 1322, the decoder reselects the home frequency to determine if the global pager is still beyond the coverage area, or if the global pager has returned to the local geographic coverage area.

If the assigned country code and/or location code was not detected at block 1318, indicating the user has traveled to a different global geographic area covered by the same, or a different satellite, transmitting a different country code and/or location code, the decoder begins searching for the active satellite channel in the global geographic area in which the global pager is currently located, at block 1324. For each satellite channel selected, the decoder checks for the presence of signal, at block 1326. This may be accomplished by correlating for recognizable data, or by monitoring the output of a received signal strength indicator, as previously described. If a signal is not detected, indicating the selected satellite channel is inactive in the current geographic area, at block 1326, the decoder looks to determine if a timer time-out has occurred, at block 1328. If a timer time-out has not occurred, at block 1328, the satellite receive frequency is incremented, and the presence of an active satellite channel is again monitored at block 1326. If the time has timed-out at block 1328, the decoder again resets the channel frequency synthesizer to the local channel, at block 1302 and the operation repeats as previously described.

When a signal is detected, at block 1326, indicating the global pager has determined the active satellite channel for the particular global geographic area in which the global pager is currently operating, the decoder begins to correlate the received signal for detected bit rate, at block 1320. This is done to determine the active signaling format utilized in the global geographic area in which the global pager is currently operating. Once the bit rate has been determined at block 1330, the decoder can select the appropriate decoding algorithm for the signaling protocol in use in that particular global geographic area. The decoder then synchronizes to the satellite transmitted information, at block 1332, and then begins correlating for country code and/or location code, at block 1334. Once the country code and/or location code is determined at block 1334, the decoder begins searching for addresses and messages, at block 1336. The global pager will remain on the satellite channel, until a loss of signal is detected at block 1340, or until a new country code and/or location code has been detected, indicating the global pager has entered a different global geographic area, at block 1342. The decoder would reset the channel frequency synthesizer to the local channel, at block 1302, and repeat the operation previously described.

Messages directed to a global pager on a local channel are redirected to the global pager through the satellite channel in any of a number of methods. The simplest, and most straightforward method of forwarding messages occurs when the global pager user calls into the local system operator to have any messages redirected to the satellite based system. Depending upon the destination information provided by the global pager user, the messages can be forwarded to satellites providing coverage to one or more satellite geographic areas, thereby providing continuous message delivery while in the home satellite geographic area, and while in transit to the final destination.

In the instance where the global pager has strayed from the area of coverage, and when acknowledge back capability is provided in the global pager, failure of the global pager to acknowledge back receipt of the address would result in the local message being redirected to the satellite system. In this instance, the message would be repeated through the satellite based system to the global pager, which as previously described would have also switched to the satellite based system when the global pager failed to detect the special code transmitted on the local channel.

While a specific embodiment of this invention has been shown and described, further modifications and improvements will occur to those skilled in the art. All modifications which retain the basic underlying principles disclosed and claimed herein are within the scope and spirit of the present invention.

We claim:

1. A global communication system, comprising:
   terrestrial transmitter means, for transmitting coded message signals on at least one terrestrial channel in a plurality of local geographic areas, the coded message signals transmitted thereon including a first channel identification codeword identifying the terrestrial channel;
   satellite transmitter means, for transmitting the coded message signals on at least one satellite channel in a plurality of global geographic areas, the global geographic areas encompassing in part at least one of the local geographic areas, the coded message signals transmitted thereon including a second channel identification codeword, different from the first, identifying the satellite channel; and
   receiver means, capable of receiving the coded message signals transmitted on the terrestrial and the satellite channels and including channel selecting means responsive to the channel identification codewords received thereon,
   said channel selecting means selecting the terrestrial channel and maintaining the receiver operation thereon when the channel identification codeword received on the terrestrial channel matches the first channel identification codeword, otherwise said channel selecting means selecting the receiver operation on the satellite channel,
   said channel selecting means then being further responsive to the channel identification codeword received on the satellite channel, for maintaining the receiver operation on the satellite channel when the channel identification codeword received thereon matches the second channel identification codeword, and periodically thereafter, said channel selecting means reselecting the receiver operation on the terrestrial channel for a predetermined time interval to enable decoding of the channel identification codeword received thereon.

2. The global communication system according to claim 1 wherein said terrestrial transmitter means transmits different channel identification codewords on the terrestrial channels in each of the plurality of local geographic areas.

3. The global communication system according to claim 1 wherein said satellite transmitter means transmits different channel identification codewords on the satellite channels in each of the plurality of global geographic areas.

4. The global communication system according to claim 1 wherein said channel selecting means selects the satellite channel only when the channel identification codeword received on the terrestrial channel fails to match the first predetermined codeword within the predetermined number of detection time intervals.

5. A global communication receiver, capable of receiving coded messages signals transmitted on at least two channels, the second channel being transmitted from a satellite, the coded message signals including a first channel identification codeword identifying the first channel, and a second channel identification codeword, different from the first, identifying the second channel, said global communication receiver comprising:

receiver means, for receiving the coded message signals transmitted on the first and second channels;

decoding means, responsive to the received coded message signals, for decoding the channel identification codewords; and channel selecting means, responsive to said decoding means, for maintaining the receiver operation on the first channel, when the received channel identification codeword received on the first channel matches the first channel identification codeword, otherwise said channel selecting means selecting the receiver operation on the second channel, said channel selecting means, being further responsive to said decoding means, for maintaining the receiver operation on the second channel when the received channel identification codeword received on the second channel matches the second channel identification codeword, and periodically thereafter said channel selecting means reselecting the receiver operation on the first channel for a predetermined time interval to enable decoding of the channel identification codeword received thereon.

6. The global communication receiver according to claim 5 wherein said channel selecting means includes manual switching means for selecting one channel from the first or second channels.

7. The global communication receiver according to claim 5 further including means for indicating to the user the channel status of the receiver.

8. A method for selecting a channel on which a global communication receiver will operate to receive transmitted coded message signals, the global communication receiver capable of receiving at least two channels selected from a plurality of channels, at least one of the channels being transmitted from a satellite, the coded message signals including a first channel identification codeword identifying the first channel, and a second channel identification codeword, different from the first, identifying the second channel, said method comprising the steps of:

presetting the receiver to the first channel, wherein the receiver can detect and decode the coded message signals including the channel identification codewords;

correlating the channel identification codeword received on the first channel with the first channel identification codeword;

maintaining operation of the receiver on the first channel, in accordance with said first step of correlation, when the channel identification codeword received thereon matches the first channel identification codeword;

selecting the second channel transmitted from the satellite in accordance with said first step of correlating when the received channel identification codeword does not match the first predetermined channel identification codeword;

correlating the channel identification codeword received on the second channel with the second predetermined channel identification codeword;

maintaining operation of the receiver on the second channel, in accordance with said second step of correlation, when the channel identification codeword received thereon matches the second channel identification codeword;

periodically thereafter reselecting the first channel for a predetermined time interval to enable decoding of the received channel identification codeword received thereon, in accordance with said second step of correlation; and maintaining the operation of the receiver on the first channel when the received channel identification codeword again matches the first channel identification codeword.

9. A global communication system, comprising:

terrestrial transmitter means, for transmitting coded message signals on at least one terrestrial channel in a plurality of local geographic areas, the coded message signals including a first transmission attribute identifying the terrestrial channel;

satellite transmitter means, for transmitting coded message signals on at least one satellite channel in a plurality of global geographic areas, the global geographic areas encompassing in part at least one of the local geographic areas, the coded message signals including a second transmission attribute different from the first transmission attribute, for identifying the satellite channel; and receiver means, capable of receiving the coded message signals on the terrestrial channel and the satellite channel, said receiver means including channel selecting means, responsive to the first transmission attribute received on the terrestrial channel, for maintaining the receiver operation thereon when the transmission attribute received matches the first transmission attribute, otherwise said channel selecting means selecting the receiver operation on the satellite channel, said channel selecting means then being further responsive to the second transmission attribute received on the satellite channel, for maintaining the receiver operation on the satellite channel when the transmission attribute received thereon matches the second transmission attribute, and for periodically thereafter reselecting receiver operation on the terrestrial channel for a predetermined time interval to enable decoding of the transmission attribute received thereon.

10. The global communication system according to claim 11 wherein said satellite transmitter means transmits different transmission attributes on the satellite channels in each of the plurality of global geographic areas.

11. The global communication system according to claim 9 wherein the terrestrial transmitter means transmits one or more different transmission attributes on each of the terrestrial channels in each of the plurality of local geographic areas.

12. The global communication system according to claim 9 wherein the transmission attribute detected on the terrestrial channel includes detection of a predetermined channel operating frequency.

13. The global communication system according to claim 9 wherein the transmission attribute detected on the terrestrial channel includes detection of a predetermined signaling protocol.

14. The global communication system according to claim 9 wherein transmission attribute detected on the terrestrial channel includes detection of a predetermined coded synchronization codeword.

* * * * *